US009838931B2

United States Patent
Wong et al.

(10) Patent No.: US 9,838,931 B2
(45) Date of Patent: Dec. 5, 2017

(54) INTERFERENCE REDUCTION (75) Inventors: Shin Horng Wong, Chippenham (GB); Matthew Baker, Canterbury (GB)

(73) Assignee: Alcatel Lucent, Boulogne-Billancourt (FR)

( * ) Notice: Subject to any disclaimer, the term of this patent is extended or adjusted under 35 U.S.C. 154(b) by 343 days.

(21) Appl. No.: 14/238,329

(22) PCT Filed: Jul. 24, 2012

(86) PCT No.: PCT/EP2012/003125
§ 371 (c)(1),
(2), (4) Date: Jun. 11, 2014

(87) PCT Pub. No.: WO2013/023735
PCT Pub. Date: Feb. 21, 2013

(65) Prior Publication Data
US 2014/0287763 A1 Sep. 25, 2014

(30) Foreign Application Priority Data
Aug. 12, 2011 (EP) .................................. 11360038

(51) Int. Cl.
*H04W 36/20* (2009.01)
*H04W 36/18* (2009.01)
(Continued)

(52) U.S. Cl.
CPC ........... *H04W 36/20* (2013.01); *H04W 36/18* (2013.01); *H04W 72/048* (2013.01); *H04W 36/0072* (2013.01); *H04W 36/0077* (2013.01)

(58) Field of Classification Search
CPC ..... H04W 36/20; H04W 36/18; H04W 36/30; H04W 52/40; H04W 36/12; H04W 36/14
(Continued)

(56) References Cited

U.S. PATENT DOCUMENTS 8,325,684 B2    12/2012 Pani et al.
2002/0077141 A1* 6/2002 Hwang ............... H04W 52/143
455/522
(Continued)

FOREIGN PATENT DOCUMENTS

CN    1393070      1/2003
CN    101489303    7/2009
(Continued)

OTHER PUBLICATIONS

International Search Report for PCT/EP2012/003125 dated Nov. 19, 2012.
(Continued)

*Primary Examiner* — Cong Tran
(74) *Attorney, Agent, or Firm* — Fay Sharpe, LLP (57) ABSTRACT

A method of reducing inter cell interference in a wireless communication network, a network control node, network access node, user equipment and computer program product operable to implement that method. The method is for use in a network comprising a plurality of network access nodes, each supporting a region of radio overage, and the method comprises: discovering, for a first network access node, at least one adjacent network access node; allocating at least one predetermined shared radio channel for radio communication commenced within an overlapping radio coverage region between said first network access node and said adjacent network access node; and communicating an indication of said at least one predetermined shared radio channel to said first network access node and said adjacent network access node. The method enables shared radio channels to be used in a "soft handover" type scenario, by enabling adjacent network access nodes to decipher and decode transmissions made by user equipment operating in overlap regions in a network. Such methods may be par-
(Continued)

UE in CELL_FACH "SHO"

ticularly suited to user equipment operating in a Cell_FACH mode.

10 Claims, 2 Drawing Sheets

(51) Int. Cl.
 *H04W 72/04* (2009.01)
 *H04W 36/00* (2009.01)
(58) Field of Classification Search
 USPC ............ 455/436–439, 442, 443, 446–447; 370/331–334
 See application file for complete search history.

(56) References Cited

U.S. PATENT DOCUMENTS

| | | | | |
|---|---|---|---|---|
| 2003/0083069 A1* | 5/2003 | Vadgama | ............... | H04W 36/22 455/436 |
| 2007/0149201 A1* | 6/2007 | Dominique | ........... | H04W 52/40 455/442 |
| 2007/0223419 A1* | 9/2007 | Ji | ........................ | H04W 16/14 370/329 |
| 2009/0069017 A1* | 3/2009 | Usuda | ................. | H04B 1/7103 455/442 |
| 2009/0168728 A1 | 7/2009 | Pani et al. | | |
| 2009/0201876 A1 | 8/2009 | Morimoto et al. | | |
| 2009/0247161 A1 | 10/2009 | Pani et al. | | |
| 2010/0029319 A1* | 2/2010 | Higuchi | .............. | H04W 52/243 455/522 |
| 2010/0291940 A1* | 11/2010 | Koo | ....................... | H04B 7/024 455/450 |
| 2011/0268028 A1* | 11/2011 | Stern-Berkowitz | ... | H04L 5/0048 370/328 |
| 2012/0099444 A1* | 4/2012 | Hakola | ............... | H04W 52/242 370/248 |
| 2012/0184206 A1* | 7/2012 | Kim | ...................... | H04L 5/0091 455/9 |
| 2012/0282972 A1 | 11/2012 | Folkstedt et al. | | |
| 2013/0153298 A1* | 6/2013 | Pietraski | ................ | H04L 5/001 175/45 |

FOREIGN PATENT DOCUMENTS

| | | |
|---|---|---|
| EP | 1 868 394 A1 | 12/2007 |
| JP | 2006-311475 | 11/2006 |
| JP | 2011-509050 | 3/2011 |
| JP | 2011-515964 | 5/2011 |
| JP | 2013-512599 | 4/2013 |
| KR | 10-2010-0112147 | 10/2010 |
| WO | WO 2006/106561 | 10/2006 |

OTHER PUBLICATIONS

Huawei, "On DPDCH and CELL_Fach support for UL CLTD", R1-111403, 3GPP TSG RAN WG1 Meeting #65, Barcelona, Spain May 9-13, 2011.

* cited by examiner

FIG. 1

FIG. 2
UE in CELL_FACH "SHO"

INTERFERENCE REDUCTION

FIELD OF THE INVENTION

The present invention relates to a method of managing inter cell interference, a control network node, user equipment and network access node and computer program products operable to implement that method.

BACKGROUND

Wireless communication networks are known. In a cellular system, radio coverage is provided to user equipment, for example, mobile telephones, by geographical area. Those geographical areas of radio coverage are known as cells. A base station is located in each geographical area to provide the required radio coverage. A base station may support more than one cell providing coverage in the same geographical area. User equipment in the area served by a base station receives information and data from a base station and transmits information and data to a base station.

Information and data transmitted by a base station to user equipment occurs on channels of radio carriers known as downlink carriers. Information and data transmitted by user equipment to a base station occurs on uplink channels of radio carriers known as uplink carriers.

In wireless telecommunications networks, user equipment can move between geographical base station coverage areas. Services provided to user equipment are typically overseen by a radio network controller (RNC). The RNC communicates with user equipment and base stations and determines which base station each user equipment may be primarily connected to. Furthermore, the RNC acts to control and communicate with a base station and user equipment when user equipment moves from a geographical area served by one base station to a geographical area served by another base station, or between geographical areas served by the same base station.

In some cellular systems, for example, in a UMTS system, functionality known as "soft handover" (SHO) can be implemented. That functionality allows data traffic transmitted by user equipment or other mobile terminals using uplink channels to be received and decoded by multiple base stations. Those base stations may also be known in a UMTS system as "node Bs". Furthermore, if utilizing soft handover techniques, a user equipment may receive and combine data and control signals from multiple base stations in the downlink. That is to say, the user equipment can receive or listen to transmissions from multiple base stations and multiple base stations may listen to transmissions made by user equipment. This has several advantages including that transmissions made by user equipment are not seen as interference by adjacent cells. In order that such soft handover techniques can be implemented, it is necessary for user equipment and the relevant nodeBs to known that they are allowed and expecting to communicate with one another. User equipment is typically informed by the network of those nodeBs by which its transmissions can be heard and to which it may listen. That list of base stations is referred to as the "active set" of that user equipment.

Typically, if implementing a soft handover regime, a radio link is first set up between user equipment and a single base station. If it is determined that entry to a soft handover regime is desirable and possible, necessary information about the configuration of existing uplink transmissions from the user equipment to the single base station, including for example, scrambling code being used, can be passed from a first base station via a radio network controller (RNC) to a second base station to be added to the active set of the user equipment. That information passed to a second base station enables the second base station to synchronize its operation to the user equipment's uplink transmissions. Once a second node B has obtained uplink synchronization, the second base station can set up a new downlink with the user equipment such that its transmission timing is likely to be successfully received at the user equipment close to the reception timing of the existing downlink between the first base station and the user equipment.

Use of soft handover techniques can lead to improved network performance, since by allowing more than one base station to communicate with user equipment it is possible to obtain a degree of selective combination through macro diversity and soft combinations leading to gain. Soft handover functionality also allows an opportunity to minimise interference caused between cells by user equipment operating at the edge of geographical coverage regions supported by adjacent base stations.

As the configuration and arrangement of network nodes such as base stations within a wireless communication network becomes increasingly complex, and functionality of user equipment is increased, unexpected situations can occur which can lead to decreased overall network performance.

Accordingly, it is desired to provide an improved technique for facilitating use of soft handover techniques to reduce interference within a network.

SUMMARY

According to a first aspect, there is provided a method of managing inter cell interference in a wireless communication network comprising a plurality of network access nodes, each supporting a region of radio overage, said method comprising: discovering, for a first network access node, at least one adjacent network access node; allocating at least one predetermined shared radio channel for radio communication commenced within an overlapping radio coverage region between said first network access node and said adjacent network access node; and communicating an indication of said at least one predetermined shared radio channel to said first network access node and said adjacent network access node.

The introduction of smartphones has led to a change in the profile of data traffic handled by networks. It will be appreciated that data traffic may be particularly bursty in nature; for example, demand may be high whilst user equipment loads a website page, but then substantially zero whilst a user reads that website. Operation in a full cell_DCH state for such bursty traffic can be particularly wasteful of battery and, thus, the ability to handle bursty traffic without entering a more dedicated state has been recognised to be beneficial.

The soft handover techniques described previously have been determined to be particularly suitable for use when user equipment is operating in a cell_DCH state. As described, in such a state data transmissions are typically likely to last for a significant length of time and, thus, setting up the relationships necessary for soft handover via messaging through an RNC has been deemed to be worth the time taken since overall data traffic throughput can be significantly increased through a network.

As described above, the process of soft handover offers significant opportunity for a network to operate more efficiently.

User equipment may operate in various modes in, for example, a UMTS telecommunications network. On initial turning on of user equipment in a cell, it will typically operate in "idle mode". Once it synchronizes and attaches itself to a base station it gains radio resource control (RRC) connection and is referred to as being in a connected mode. User equipment in idle mode does not have a radio resource control connection. If user equipment is RRC connected it can be in one of five different RRC states: cell_DCH, cell_FACH, enhanced cell_FACH, cell_PCH or URA_PCH states.

User equipment typically moves into cell_DCH state when its traffic is high, since in such a state the user equipment is allocated a dedicated channel on which to transmit and receive data from a base station. In UMTS network architecture, user equipment can be in cell_DCH state when it is expected to have a high volume of traffic. Operation in a cell_DCH state is typically highly demanding of battery power.

Historically, user equipment operated, when not in cell_DCH state, using a random access channel (RACH) on the uplink and a base station will operate to communicate with user equipment using a forward access channel (FACH). RACH and FACH had a very small data carrying ability and in WCDMA or UMTS systems a capability for user equipment and base stations to operate and communicate data traffic therebetween using a shared or common resource on downlink and uplink when user equipment is in a cell_FACH state has been introduced.

In the uplink, the data traffic transmission occurs using an enhanced dedicated channel, and in the downlink it is sent on a high speed downlink shared channel. Such channels allow user equipment and base stations to communicate and to transmit longer and larger data packets between themselves for a time without the need for user equipment to enter a cell_DCH state. Such arrangements allow user equipment to remain in a cell_FACH state longer without transitioning to more dedicated RRC states, such as cell_DCH, thereby allowing a power consumption saving.

However, when operating in a cell_FACH state, data transmissions to and from user equipment are typically characterised by short bursts. As such, the relatively long delay incurred by passing information from user equipment and base stations via an RNC to set up soft handover by traditional methods would typically be too long for soft handover to be set up and used before a data burst occurring in a cell_FACH state ends. As a result, soft handover is not usually supported whilst user equipment operates in a cell_FACH state.

The lack of support for soft handover for user equipment operating in cell_FACH can result in worse system performance than user equipment and base stations achieve when user equipment is operating in a cell_DCH state. This is because there is no selection combining through macro diversity when operating in cell_FACH, leading to higher uplink transmission power requirements. Furthermore, if operating in a cell_FACH state, power control commands are only received from one base station at the user equipment. User equipment near the edge of a coverage area supported by a serving cell can therefore cause significant interference to neighbouring cells which are unable to request the user equipment reduces its power transmission and, even if they could, it would not be appropriate to do so unless the neighbour cells were also helping to receive an uplink signal, since any reduction in power instructed by an adjacent cell could reduce the effective data rate being achieved by user equipment in its serving cell.

The first aspect recognises that it is possible to enable and implement soft handover functionality in other ways, thereby enabling the use of soft handover in cell_FACH, for example, as well as cell_DCH user equipment states.

In particular, by pre-allocating a shared radio channel, or radio channels, specifically to user equipment operating in overlapping regions of radio coverage supported by wireless access nodes, for example, base stations, it is possible to help to ensure the base stations supporting radio service in those overlapping regions can be prepared to decode transmissions on those radio channels made by user equipment in the overlapping regions. By allowing base stations enough information to allow such decoding, interference caused by user equipment to overall network operation can be managed.

Shared channels are typically those for which user equipment must compete. For example, if user equipment is operating in a CELL_FACH mode, two types of common resources are available to user equipment for performing uplink transmissions: namely, RACH (Random Access Channel) and common E-DCH (Enhanced Dedicated Channel). Those common resources may be known as shared, or common channels, and in the uplink as common uplink channels.

The common E-DCH resource is typically used for high data rate bursts of data traffic. There are up to 32 common E-DCH resources available in a cell. User equipment wishing to use a common E-DCH must contest with other user equipment in a given cell for a common E-DCH resource. That process is similar to the process of user equipment in a cell contesting for a RACH. Once allocated an E-DCH, user equipment makes a transmission. Once the user equipment finishes its transmission, for example, by emptying its buffer, it is operable to release the E-DCH resource so that other user equipment in the cell can use it.

The first aspect recognises that the degree of competition for common radio channels can cause a degree of complexity to adjacent wireless access nodes, for example, base stations eNodeBs or femto base stations, and seeks to minimise possible options available to user equipment operating in overlapping areas of radio coverage, thus increasing the likelihood that those transmissions made in overlap regions will be decodable.

According to some embodiments, assignment of one or more sets of "SHO preamble signatures" and corresponding common E-DCH resources occurs specifically for user equipment operating in overlapping regions. Relevant neighbour cells are configured with a knowledge of relevant SHO preamble signatures and corresponding E-DCH resources.

In one embodiment, the method comprises: comprising allocating a sub-set of all available shared radio channels to the allocated at least one predetermined shared radio channel for radio communication commenced within an overlapping radio coverage region between the first network access node and the adjacent network access node. Accordingly, not all available shared channels may be allocated for use in overlap regions, leaving some, or a majority, of shared channels available for communication within non-overlap regions of a cell supported by a network access node.

In one embodiment, the method comprises: determining a first at least one predetermined shared radio channel for radio communication commenced within an overlapping radio coverage region between the first network access node and the adjacent network access node when the first network access node supports a serving cell and the at least one adjacent network access node supports a potential target cell; and determining a second at least one predetermined shared radio channel for radio communication commenced within an overlapping radio coverage region between the first network access node and the at least one adjacent network access node when said the network access node supports a potential target cell and the at least one adjacent network access node supports a serving cell.

Accordingly, in some embodiments, each SHO or "overlap" region has a different set of predetermined shared radio channels, or predetermined SHO preambles and/or corresponding E-DCH resources allocated thereto. Once determined by a control network node, for example an RNC, a list of predetermined shared radio channels, or SHO preambles, may be broadcast by each wireless access node, for each overlap region. For example, a first cell, Cell 1, operating as a serving cell to user equipment, broadcasts one list of SHO preambles for an overlap region with a second cell, cell 2, and another list for an overlap region with cell 3.

In one embodiment, the method comprises:
determining a pair of the first at least one predetermined shared radio channel and the second at least one predetermined shared radio channel for each pair of: the first network access node supporting a serving cell and the at least one adjacent network access node supporting a potential target cell. According to such embodiments, for example, a list of predetermined shared radio channels or SHO preambles for a given overlap region differs in dependence upon the serving cell. For example, a list of SHO preambles broadcast by Cell 2 for an overlap or SHO region with Cell 1 would typically different from the list of SHO preambles broadcast by Cell 1 for an SHO region with Cell 2. Accordingly, only one network access node supporting a cell may have control of assigning each resource, which helps to avoid problems that might otherwise occur if, for example, a neighbour cell fails to detect a preamble thus leaving it unaware that the corresponding E-DCH resource is already in use by user equipment in the overlap region.

In one embodiment, the step of communicating an indication of the at least one predetermined shared radio channel to the first network access node and the adjacent network access node comprises an indication of how to decode communications made on the at least one predetermined shared radio channel. Accordingly, information sent to network access nodes allows the decoding of transmissions made in an overlap region irrespective of the network access node to which it is primarily attached. According to embodiments, for example, the predetermined shared radio channels, and/or SHO E-DCH resources are selected a-priori and all information for demodulation of those resources, for example, scrambling code, F-DPCH offset, is sent to neighbouring cells.

In one embodiment, the predetermined shared radio channels may be common E-DCH resources. Those shared channels may be allocated to user equipment operating in a Cell_FACH state.

A second aspect provides a computer program product operable, when executed on a computer, to perform the method of the first aspect.

A third aspect provides a network control node operable to reduce inter cell interference in a wireless communication network comprising a plurality of network access nodes, each supporting a region of radio overage, the network control node comprising: discovery logic, operable to discover, for a first network access node, at least one adjacent network access node; allocation logic, operable to allocate at least one predetermined shared radio channel for radio communication commenced within an overlapping radio coverage region between the first network access node and the adjacent network access node; and communication logic, operable to communicate an indication of the at least one predetermined shared radio channel to the first network access node and the adjacent network access node.

According to the third aspect, there may be a network control node, for example RNC, Femto Gateway or similar, operable to oversee implementation of the method of the first aspect.

In one embodiment, the network control node comprises: allocation logic operable to allocate a sub-set of all available shared radio channels to the allocated at least one predetermined shared radio channel for radio communication commenced within an overlapping radio coverage region between the first network access node and the adjacent network access node.

In one embodiment, the network control node comprises: determination logic operable to determine a first at least one predetermined shared radio channel for radio communication commenced within an overlapping radio coverage region between the first network access node and the at least one adjacent network access node when the first network access node supports a serving cell and the at least one adjacent network access node supports a potential target cell; and determine a second at least one predetermined shared radio channel for radio communication commenced within an overlapping radio coverage region between the first network access node and the at least one adjacent network access node when the first network access node supports a potential target cell and the at least one adjacent network access node supports a serving cell.

In one embodiment, the network control node comprises: determination logic operable to determine a pair of the first at least one predetermined shared radio channel and the second at least one predetermined shared radio channel for each pair of: the first network access node supporting a serving cell and the at least one adjacent network access node supporting a potential target cell.

In one embodiment, the network control node comprises: communication logic operable to communicate an indication of how to decode communications made on the at least one predetermined shared radio channel.

A fourth aspect provides a method of controlling inter cell interference in a wireless communication network comprising a plurality of network access nodes, each supporting a region of radio coverage, the method comprising:
determining at least one predetermined shared radio channel for radio communication commenced within an overlapping radio coverage region; and preparing for communications within the communication network on the predetermined shared radio channel.

The fourth aspect recognises that wireless access nodes, for example, base stations, within a network are provided with information from a network control node in order to implement a method according to the first aspect. The fourth aspect recognises that a base station may be operable to take action to make preparations for communications occurring on predetermined shared radio channels once aware of those predetermined shared channels. Accordingly, when a network access node supporting a cell detects use of the predetermined shared radio channel, or for example, one of a predetermined set of SHO preamble signatures being transmitted by a UE in its cell, it may permit the use of the corresponding E-DCH, or it may assign a different E-DCH resource. Each cell is configured to search for the preambles that are configured for use in the overlap regions by its neighbours; when a neighbour cell detects a SHO preamble from a different serving cell, the neighbour cell proceeds to try to decode the corresponding E-DCH.

According to one embodiment, the step of preparing comprises:
allocating the at least one predetermined shared radio channel to a request for a shared radio channel originating within the overlapping radio coverage region. Accordingly, the network access node may be configured to ensure that user equipment requesting resource located in an overlap region are allocated predetermined shared channels and thus predetermined resource (if available), thus enabling predictable operation in overlap regions and facilitating SHO techniques with adjacent cells also aware of the predetermined shared radio channels.

In one embodiment, the request comprises a request for at least one predetermined shared radio channel for radio communication. Accordingly, user equipment may also be informed of the predetermined shared radio channels on which communication ideally occurs when in overlap regions of coverage. Those user equipment aware of such allocations may be operable to request communication occurs on those channels when the user equipment determines it is operating in such an overlap region of radio coverage. Accordingly, if user equipment determines that it is operating within an overlapping region, for example, by determining that a measured relative pilot signal of a neighbour cell to that of its serving cell meets predetermined "overlap" criteria, the user equipment may be operable to select a SHO preamble from a predetermined set of SHO preamble signatures.

In one embodiment, the method comprises determining whether the requested at least one predetermined shared radio channel for radio communication is available for use and, if not, allocating another of the at least one predetermined shared radio channels. Accordingly, more than one predetermined shared radio channel may be allocated for use in a given overlap region. If a requested channel is unavailable, a base station may be operable to select another of the predetermined "overlap shared channels" in preference to one being used in non-overlap areas. Such an method attempts to ensure that the chance of utilising a SHO regime in a communication network between adjacent base stations can be increased.

In some embodiments, if a base station supporting a serving cell detects one of the SHO preamble signatures, or request for a predetermined overlap shared channel, being transmitted by a user equipment in its cell, it may permit the use of the corresponding E-DCH, or it may assign a different E-DCH resource. Each base station supporting a cell is configured to search for the preambles that are configured for use in the overlap regions by its neighbours. Thus, when a neighbour cell detects a SHO preamble from a different serving cell, the neighbour cell proceeds to try to decode the corresponding E-DCH.

In one embodiment, the method comprises determining whether the requested at least one predetermined shared radio channel for radio communication is available for use and, if none of the at least one predetermined shared radio channels are available, allocating a non-predetermined shared radio channel. Accordingly, assignment of a non-predetermined radio channel may make it hard for adjacent wireless access network nodes to decode transmissions made by user equipment in an overlap region. For example, according to particular embodiments, if a serving cell chooses to assign a different E-DCH resource to those in the predetermined SHO preamble lists, the neighbour cell will not know which resource has been assigned and it may be difficult to decode the data. For example, in order to attempt to decode the signal a receiving cell may have to compare, in parallel, all possible SHO E-DCH scrambling codes. Therefore it may be possible for a cell which chooses to assign a different E-DCH resource to assign a non-SHO E-DCH resource, thereby avoiding "cluttering up" SHO E-DCH resources with user equipment whose transmissions are not actually being received according to SHO procedures.

In one embodiment, the step of preparing comprises:
preparing to decode information transmitted on the predetermined shared radio channel. Accordingly, each network access node may be operable to be pre-configured to receive and decode transmissions made by users in an overlap region with neighbour cells supported by different network access nodes, thus enabling a degree of SHO operation within a network and reducing unnecessary interference. In specific embodiments, for example, each cell is configured to search for the preambles that are configured for use in the overlap regions by its neighbours; when a neighbour cell detects a SHO preamble from a different serving cell, the neighbour cell proceeds to try to decode the corresponding E-DCH.

A fifth aspect provides a computer program product operable, when executed on a computer, to perform the method of the fourth aspect.

A sixth aspect provides a network access node operable to manage inter cell interference in a wireless communication network comprising a plurality of network access nodes, each supporting a region of radio coverage, the network access node comprising: determination logic, operable to determine at least one predetermined shared radio channel for radio communication commenced within an overlapping radio coverage region; preparation logic, operable to prepare for communications within the communication network on the predetermined shared radio channel.

The network node of the sixth aspect may be any appropriate network access node, offering access to the network to user equipment and may, for example, include base stations, small cell base stations, eNodeBs and similar.

In one embodiment, the network access node further comprises: preparation logic operable to allocate the at least one predetermined shared radio channel to a request for a shared radio channel originating within the overlapping radio coverage region.

In one embodiment, the request comprises a request for at least one predetermined shared radio channel for radio communication.

In one embodiment, the network access node further comprises: determination logic operable to determine whether the requested at least one predetermined shared radio channel for radio communication is available for use and, if not, to allocate another of the at least one predetermined shared radio channels.

In one embodiment, the network access node further comprises: determination logic operable to determine whether the requested at least one predetermined shared radio channel for radio communication is available for use and, if none of the at least one predetermined shared radio channels are available, to allocate a non-predetermined shared radio channel.

In one embodiment, the network access node further comprises: preparation logic operable to decode information transmitted on the predetermined shared radio channel.

A seventh aspect provides a method of requesting a shared radio channel in a wireless communication network comprising a plurality of network access nodes, each supporting a region of radio coverage, the method comprising: receiving an indication of at least one predetermined shared radio channel for radio communication commenced within an overlapping radio coverage region between a first network access node and an adjacent network access node; determining communication is to commence in the overlapping radio coverage region; and requesting allocation of the at least one predetermined shared radio channel on which to commence communication within the network.

The seventh aspect recognises that providing user equipment operating within a network with details of predetermined shared radio channels on which to request communication if operating in an overlap region may allow a reduction in interference experienced across a network. If, for example, user equipment determines that it is operating within an overlapping region, for example, by determining that a measured relative pilot signal of a neighbour cell to that of its serving cell meets predetermined "overlap" criteria, the user equipment may be operable to select a SHO preamble from a predetermined set of SHO preamble signatures, or request communication take place on one of the predetermined shared radio channels.

In one embodiment, the method comprises: receiving details of the adjacent network access node control channels. Accordingly, according to some embodiments, for a given predetermined set of SHO preambles and corresponding E-DCH resources, or predetermined shared radio channels, user equipment is provided with, for example, by broadcast signalling, details of control channels (e.g. E-HICH, E-RGCH, F-DPCH) of neighbour cells so that the user equipment is operable to decode those control channels. In embodiments, each SHO E-DCH resource is associated with a set of corresponding neighbour cell control channels. Using these control channels, a neighbour cell can control transmissions of an inter-cell user equipment in a similar way to user equipment operating in SHO in CELL_DCH. As a result, cells can control uplink interference by targeting transmission from a specific user equipment (or rather common SHO E-DCH).

An eighth aspect provides a computer program product operable, when executed on a computer, to perform the method of the seventh aspect.

A ninth aspect provides user equipment operable to request a shared radio channel in a wireless communication network comprising a plurality of network access nodes, each supporting a region of radio coverage, the user equipment comprising: reception logic operable to receive an indication of at least one predetermined shared radio channel for radio communication commenced within an overlapping radio coverage region between a first network access node and an adjacent network access node; determination logic operable to determine communication is to commence in the overlapping radio coverage region; and request logic operable to request allocation of the at least one predetermined shared radio channel on which to commence communication within the network.

In one embodiment, the reception logic is operable to receive details of the adjacent network access node control channels.

Further particular and preferred aspects are set out in the accompanying independent and dependent claims. Features of the dependent claims may be combined with features of the independent claims, as appropriate, and in combinations other than those explicitly set out in the claims.

BRIEF DESCRIPTION OF THE DRAWINGS

Embodiments of the present invention will now be described further with reference to the accompanying drawings, in which.

DESCRIPTION OF THE EMBODIMENTS

Figure 1:
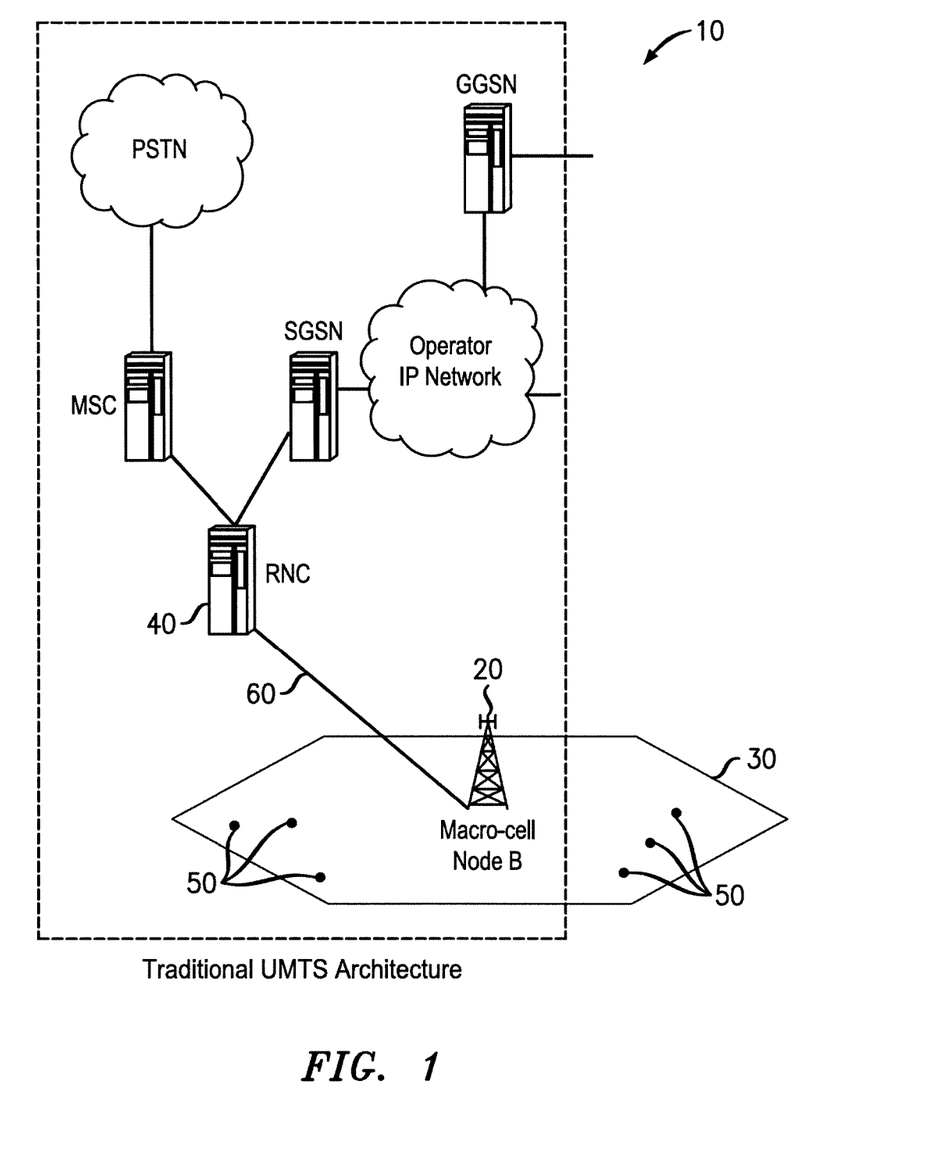
FIG. 1 illustrates the main components of a wireless telecommunications network according to one embodiment.

FIG. 1 illustrates schematically the main components of a wireless telecommunications system 10 according to one embodiment. User equipment 50 roam through the wireless telecommunications system. Base stations 20 are provided which support areas of radio coverage 30. A number of such base stations 20 are provided and are distributed geographically in order to provide a wide area of coverage to user equipment 50. When user equipment is within an area served by a base station 30, communications may be established between the user equipment and the base station over associated radio links. Each base station typically supports a number of sectors within the geographical area of service 30.

Typically, a different antenna within a base station supports each associated sector. Each base station 20 has multiple antennas. It will be appreciated that FIG. 1 illustrates a small sub-set of a total number of user equipment and base stations that may be present in a typical communications system.

The wireless communications system is managed by a radio network controller (RNC) 40. The RNC 40 controls operation of the wireless telecommunications system by communicating with a plurality of base stations over a backhaul communications link 60. The RNC also communicates with user equipment 50 via each base station and, thus, effectively manages a region of the entire wireless communications network 10. User equipment communicates with base stations 20 by transmitting data and information on channels known as uplink or reverse channels, and a base station 20 communicates with user equipment 50 by transmitting data and information on radio channels known as downlink or forward channels.

In some cellular systems, for example, in a UMTS system, functionality known as "soft handover" (SHO) can be implemented. According to such a system, data traffic transmitted by user equipment or other mobile terminals using uplink channels can be received at multiple base stations. Those base stations may also be known in UMTS as "node Bs". Furthermore, if utilizing soft handover techniques, a user equipment may receive and combine data from multiple base stations in the downlink. That is to say, the user equipment can receive or listen to transmissions from multiple base stations and multiple base stations may listen to transmissions made by user equipment. This has several advantages including that transmissions made by user equipment are not seen as interference by adjacent cells. In order that such soft handover techniques can be implemented, it is necessary for user equipment and the relevant node Bs to know that they are allowed to communicate with one another. The user equipment is informed of those node Bs by which its transmissions can be heard and to which it may listen. That list of base stations is considered to be in the "active set" of that user equipment.

Typically, if implementing a soft handover regime, a radio link is first set up between user equipment and a single base station. If it is determined that entry to a soft handover regime is desirable, necessary information about the configuration of existing uplink transmissions from the user equipment to the single base station, including for example scrambling code being used, can be passed from a first base station via a radio network controller (RNC) to a second node B that is to be added to the active set of the user equipment. That information passed to a second node B enables the second node B to synchronize its operation to the user equipment's uplink transmissions. Once a second node B has obtained uplink synchronization, the second node B can set up a new downlink with the user equipment such that its transmission timing is designed to be received at the user equipment close to the reception timing of the existing downlink between the first base station and the user equipment.

Use of soft handover techniques can lead to improved network performance, since by allowing more than one base station to communicate with user equipment it is possible to obtain a degree of selective combination gain through macro diversity, soft combinations also leading to gain and to minimise interference caused between cells by user equipment operating at the edge of geographical coverage regions supported by base stations.

As described above, the process of soft handover offers significant opportunity for a network to operate more efficiently.

User equipment may operate in various modes in, for example, a UMTS telecommunications network. On initial turning on of user equipment in a cell, it will typically operate in "idle mode". Once it synchronizes and attaches itself to a base station it gains radio resource control (RRC) connection and is referred to as being in a connected mode. User equipment in idle mode does not have a radio resource control connection. If user equipment is RRC connected it can be in one of five different RRC states: cell_DCH, cell_FACH, enhanced cell_FACH, cell_PCH or URA_PCH states.

User equipment typically moves into cell_DCH state when its traffic is high, since in such a state the user equipment is allocated a dedicated channel on which to transmit and receive data from a base station. In UMTS network architecture, user equipment can be in cell_DCH state when it is expected to have a high volume of traffic. Operation in a cell_DCH state is typically highly demanding of battery power.

Historically, user equipment operated, when not in cell_DCH state, using a random access channel (RACH) on the uplink and a base station will operate to communicate with user equipment using a forward access channel (FACH). RACH and FACH had a very small data carrying ability and in WCDMA or UMTS systems a capability for user equipment and base stations to operate and communicate data traffic therebetween using a shared or common resource on downlink and uplink when user equipment is in a cell_FACH state has been introduced. In the uplink, the data traffic transmission occurs using an enhanced dedicated channel, and in the downlink it is sent on a high speed downlink shared channel. Such channels allow user equipment and base stations to communicate and to transmit longer and larger data packets between themselves for a time without the need for user equipment to enter a cell_DCH state. Such arrangements allow user equipment to remain in a cell_FACH state longer without transitioning to more dedicated RRC states, thereby allowing a power consumption saving.

It will be appreciated that data traffic may be particularly bursty in nature; for example, demand may be high whilst user equipment loads a website page, but then substantially zero whilst a user reads that website. Operation in a full cell_DCH state for such bursty traffic can be particularly wasteful of battery and, thus, the ability to handle bursty traffic without entering a more dedicated state is beneficial.

The soft handover techniques described previously have been determined to be particularly suitable for use when user equipment is operating in a cell_DCH state. As described, in such a state data transmissions are typically likely to last for a significant length of time and, thus, setting up the relationships necessary for soft handover via messaging through an RNC has been deemed to be worth the time taken since overall data traffic throughput can be significantly increased through a network.

However, when operating in a cell_FACH state, data transmissions to and from user equipment are typically characterised by short bursts. As such, the relatively long delay incurred by passing information from user equipment and base stations via an RNC to set up soft handover would typically be too long for soft handover to be set up and used before a data burst occurring in a cell_FACH state ends. As a result, soft handover is not usually supported whilst user equipment operates in a cell_FACH state.

The lack of support for soft handover for user equipment operating in cell_FACH can result in worse system performance than user equipment and base stations achieve when user equipment is operating in a cell_DCH state. This is because there is no selection combining through macro diversity when operating in cell_FACH, leading to higher uplink transmission power requirements. Furthermore, if operating in a cell_FACH state, power control commands are only received from one base station at the user equipment. User equipment near the edge of a coverage area supported by a serving cell can therefore cause significant interference to neighbouring cells which are unable to request the user equipment reduces its power transmission and, even if they could, it would not be appropriate to do so unless the neighbour cells were also helping to receive an uplink signal, since any reduction in power instructed by an adjacent cell could reduce the effective data rate being achieved by user equipment in its serving cell.

If operating in a CELL_FACH mode, two types of common resources are available to user equipment for performing uplink transmissions: namely, RACH (Random Access Channel) and common E-DCH (Enhanced Dedicated Channel).

The common E-DCH resource is typically used for high data rate bursts of data traffic. There are up to 32 common E-DCH resources available in a cell. User equipment wishing to use a common E-DCH must contest with other user equipment in a given cell for a common E-DCH resource. That process is similar to the process of user equipment in a cell contesting for a RACH. Once allocated an E-DCH, user equipment makes a transmission. Once the user equipment finishes its transmission, for example, by emptying its buffer, it is operable to release the E-DCH resource so that other user equipment in the cell can use it.

Mobility between cells for user equipment operating in CELL_FACH mode is performed by a cell reselection process. According to the cell reselection process, user equipment is operable to perform measurement of signals from potential target cells and compares the signal of those potential target cells to that of its current serving cell. If measurement of the signals reveals that a signal from a potential target cell meets cell reselection criteria, the user equipment is operable to reselect to the target cell. It will be understood that unlike the "handover" process which occurs when user equipment is operating in CELL_DCH, cell reselection is performed by the UE and not instructed or overseen by the core network.

Transmissions made by user equipment operating in an overlap region of coverage provided by adjacent cells, will typically be seen as interference in those adjacent, or neighbouring, cells.

User equipment operating using a common E-DCH in cell_FACH mode does not operate to perform cell reselection. It is therefore possible that user equipment operating in that state may move into the coverage region of a neighbour cell but cannot or will not operate to reselect the neighbouring cell into whose coverage region it has moved since it holds a common E-DCH allocated by its serving cell.

For example, user equipment may be attached to Cell 1 and acquire a common E-DCH resource whilst operating in an overlapping region with Cell 2. The user equipment moves towards neighbour Cell 2 and, at some point, predetermined cell reselection criteria are met but the user equipment is not operable to perform cell reselection since it still has a common E-DCH resource from its serving cell, Cell 1. The UE continues to move into the coverage region of Cell 2. It will be understood that the user equipment will need to transmit at very high power to continue to communicate with its serving cell, Cell 1 since it is further away from the base station supporting Cell 1.

Furthermore, it will be appreciated that such a high power transmission would typically cause excessive interference in Cell 2. Since, CELL_FACH has historically been assumed to be a temporary state, used for very low traffic activity, the scenario described was deemed unlikely. However, since CELL_FACH is used to handle bursty traffic that is typical of smartphone usage, and it is anticipated that smartphone usage is to increase significantly, more user equipment will operate in CELL_FACH for longer periods and produce larger amount of data traffic, albeit being still bursty in nature. Which makes the scenario described previously more likely and the resulting interference particularly damaging to overall performance of a network.

If operating in a dedicated radio state, CELL_DCH, the network is operable to use Soft Handover (SHO) techniques in respect of user equipment transmitting in the overlapping region. According to soft handover techniques, each user equipment transmission can also be received as a decodable signal by the neighbour cell. Furthermore, the neighbour cell is able to control the user equipment transmissions and grant. Hence the interference described above can be managed whilst user equipment operates in a cell_DCH state. In CELL_DCH, user equipment operates using a dedicated channel and thus SHO is performed on that dedicated channel. Furthermore, the user equipment operates when in a cell_DCH state, to provide constant measurement reports to the network. This enables the network to identify an "Active Set" comprising a list of identified cells that can operate to participate in SHO, for each user equipment. The network is typically operable to inform user equipment's non-serving cells in the user equipment active set of demodulation information necessary for those non-serving cells to decode transmissions made on the user equipment E-DCH (dedicated) connection. That dedicated connection remains unchanged during a transmission and is likely to be held for a long time.

In contrast, the resource in CELL_FACH is common, and one user equipment can seize different E-DCH resources over the total duration of its connection and each short burst of communication will be of a short duration, though long enough to cause interference to adjacent cells.

Furthermore, whilst operating in a Cell_FACH mode, there are no measurement reports from the user equipment sent to the network, cell reselection (dependent upon measurements made by user equipment) is autonomously performed by the UE rather than those measurements being transmitted to the network. Thus, it is difficult for the network to form an Active Set for user equipment operating in CELL_FACH and the sending of constant measurement reports to the network from a user equipment operating in CELL_FACH defeats the purposes of CELL_FACH, that is, to save on signaling messages and conserve battery power.

Embodiments aim to reduce inter-cell interference caused by user equipment operating in CELL_FACH.

Previous proposals to address the interference issue propose allowing a cell to send an inter-cell E-RGCH (E-DCH Relative Grant Channel) to control the grants of the user equipment attached to neighbouring cells. The user equipment obtains information regarding how to decode that inter-cell E-RGCH of each of its neighbour cell from information broadcast by its own serving cell. The inter-cell E-RGCH is assumed to be broadcast to all inter-cell user equipment. For example, user equipment attached to Cell 1, with neighbouring cells Cell 2 and Cell 3 is operable to listen to possible E-RGCH-2 and E-RGCH-3 broadcast by Cell 2 and Cell 3 respectively. The demodulation information regarding E-RGCH-2 and E-RGCH-3 is provided to user equipment by Cell 1.

When a cell faces high interference, it is operable to broadcast an inter-cell E-RGCH. User equipment within the overlapping region with neighbour cells of the cell facing high interference would then be operable to reduce their grant and, in doing so, reduce their transmit power. This can, in effect, reduce the interference experienced at the cell that broadcast the inter-cell E-RGCH.

According to such a proposal, user equipment need only monitor for inter-cell E-RGCH from neighbour cells if the difference in signal strengths received from serving and neighbour cells meets a predetermined threshold criteria. That threshold criteria being chosen to indicate that the user equipment is close enough to a neighbouring cell to cause harmful uplink interference.

A problem with such a proposal is that inter-cell E-RGCH cannot target specific user equipment and thus any user equipment operable to listen to an inter-cell E-RGCH would operate to reduce its grant. This could cause an excessive amount of grant reduction, leading to degraded throughput performance across the network. For example, if there are 20 user equipment operating in the overlapping region, a cell wishing to reduce its interference would broadcast an inter-cell E-RGCH. It is likely that only one user equipment operating in the overlapping region needs to reduce their grant in order to reduce the uplink interference of the cell to an acceptable level. However, due to the broadcast nature of the inter-cell E-RGCH, all 20 user equipment in the overlap region operable to listen to the broadcast E-RGCH reduce their grant. The overall degradation becomes worse in the scenario described previously in which user equipment moves deep into a coverage area of a neighbouring cell, since as user equipment moves deeper into a second cell, that cell broadcasts a stronger instruction to reduce grant on an inter-cell E-RGCH which operates to significantly reduces the throughput of other user equipment operating in the overlap region.

Embodiments described herein relate to methods in which assignment of one or more sets of "SHO preamble signatures" and corresponding common E-DCH resources occurs specifically for user equipment operating in the overlapping regions. Relevant neighbour cells are configured with a knowledge of relevant SHO preamble signatures and their corresponding E-DCH resources.

If user equipment determines that it is operating within an overlapping region, for example, by determining that a measured relative pilot signal of a neighbour cell to that of its serving cell meets predetermined "overlap" criteria, the user equipment is operable to select a SHO preamble from a predetermined set of SHO preamble signatures.

According to some embodiments, each SHO or "overlap" region has a different set of predetermined SHO preambles and corresponding E-DCH resources. A list of SHO preambles for each SHO region is broadcast by the serving cell. For example, a first cell, Cell 1, operating as a serving cell to user equipment, broadcasts one list of SHO preambles for an overlap region with a second cell, cell 2, and another list for an overlap region with cell 3.

According to some embodiments, a list of SHO preambles for a given overlap region differs in dependence upon the serving cell. For example, the list of SHO preambles broadcast by Cell 2 for an overlap or SHO region with Cell 1 would typically different from the list of SHO preambles broadcast by Cell 1 for an SHO region with Cell 2. Accordingly, only one cell may have control of assigning each resource, which helps to avoid problems that might otherwise occur if a neighbour cell failed to detect a preamble thus leaving it unaware that the corresponding E-DCH resource was already in use.

When a serving cell detects one of the SHO preamble signatures being transmitted by a UE in its cell, it may permit the use of the corresponding E-DCH, or it may assign a different E-DCH resource. Each cell is configured to search for the preambles that are configured for use in the overlap regions by its neighbours; when a neighbour cell detects a SHO preamble from a different serving cell, the neighbour cell proceeds to try to decode the corresponding E-DCH.

If a serving cell chooses to assign a different E-DCH resource to those in the predetermined SHO preamble lists, the neighbour cell will not know which resource has been assigned and it may be difficult to decode the data. For example, in order to attempt to decode the signal a receiving cell may have to compare, in parallel, all possible SHO E-DCH scrambling codes. Therefore it may be possible for a cell which chooses to assign a different E-DCH resource to assign a non-SHO E-DCH resource, thereby avoiding "cluttering up" SHO E-DCH resources with user equipment whose transmissions are not actually being received according to SHO procedures.

The sets of SHO preambles may, according to some embodiments, be subsets of conventional preambles. Similarly, corresponding SHO E-DCH resources may be subsets of conventional common E-DCH resources. According to embodiments, the SHO E-DCH resources are selected a-priori and all information for demodulation of those resources, for example, scrambling code, F-DPCH offset, is sent to neighbouring cells.

If the SHO E-DCH resources are a subset of the common E-DCH resources, a base station may allocate a SHO E-DCH resource user equipment that is not in an overlapping region if there are no other resources available or there are no user equipment in the overlapping region using the SHO E-DCH resources. Similarly, user equipment in an overlap region may be assigned a conventional common E-DCH resource if there are no SHO E-DCH resources available.

According to some embodiments, cells participating in CELL_FACH SHO will assign some searchers to look for possible SHO preambles from a neighbour. The serving cell searcher may also be assisted by knowing SFN timing and PRACH access slot configurations of neighbour cells so that it is easier for the searcher to detect a neighbour user equipment transmissions.

In an extreme case, all common E-DCH resources are also SHO common E-DCH resources. Such an arrangement enables complete SHO control on all E-DCH transmissions but demands significant resources from the neighbouring cells.

For a given predetermined set of SHO preambles and corresponding E-DCH resources, user equipment is provided with, for example, by broadcast signaling, details of control channels (e.g. E-HICH, E-RGCH, F-DPCH) of neighbour cells so that the user equipment is operable to decode those control channels.

In embodiments, each SHO E-DCH resource is associated with a set of corresponding neighbour cell control channels. Using these control channels, a neighbour cell can control transmissions of an inter-cell user equipment in a similar way to user equipment operating in SHO in CELL_DCH. As a result, cells can control uplink interference by targeting transmission from a specific user equipment (or rather common SHO E-DCH).

Figure 2:
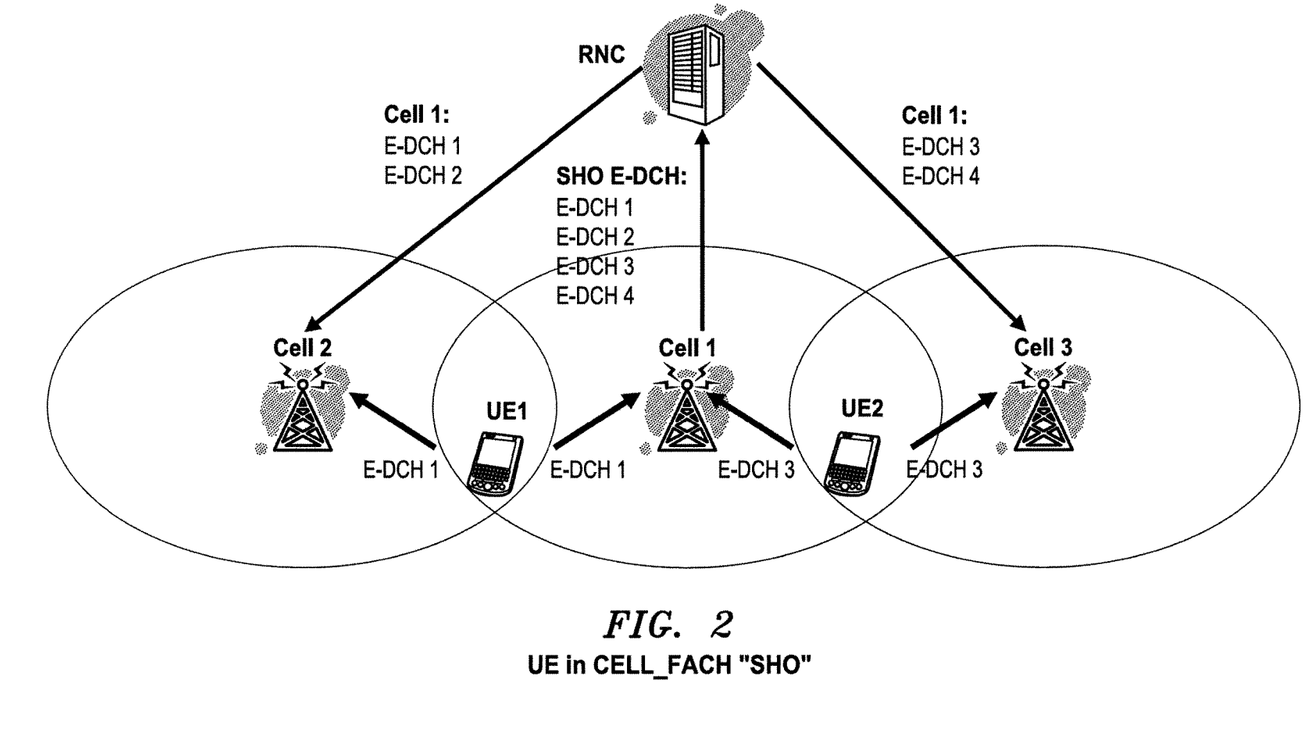
FIG. 2 illustrates schematically an example of an implementation of soft handover according to one embodiment.

FIG. 2 illustrates schematically a an interference control method according to one embodiment. As shown in FIG. 2, Cell 1 acts as a serving cell to two user equipment, UE1 and UE2. UE1 is located in an overlapping region between Cell 1 and Cell 2, whilst UE2 is located in an overlapping region between Cell 1 and Cell 3.

Cell 1 has 32 preambles and associated common E-DCH resources, which are divided as follows:
- E-DCH 1 and E-DCH 2 are SHO common E-DCH resources associated with preambles 1 and 2 for the SHO region between cells 1 and 2
- E-DCH 3 and E-DCH 4 are SHO common E-DCH resources associated with preambles 3 and 4 for the SHO region between cells 1 and 3
- E-DCH 5-E-DCH 32 are conventional common E-DCH resources Based on measurements and Active Set settings for user equipment operating in CELL_DCH, an RNC decides that most user equipment operating in the region of Cell 1 in a cell_DCH mode have Cell 2 and Cell 3 in their Active Sets.

The RNC thus determines that Cell 2 and Cell 3 can be used, in this embodiment, as potential candidates for achieving some degree of SHO functionality for user equipment transmitting data traffic in CELL_FACH mode. The RNC passes details of SHO preambles and common E-DCH resources from Cell 1 (i.e. E-DCH 1 and E-DCH 2) to Cell 2. Likewise, the RNC passes the details of SHO preambles and common E-DCH resources from Cell 1 (i.e. E-DCH 3 and E-DCH 4) to Cell 3. Cell 2 and Cell 3 then reserve some resources for inter-cell control channels (e.g. E-HICH, E-RGCH) and this information is passed to Cell 1.

UE1 and UE2, as part of their CELL_FACH procedure, measure pilot signals received from Cell 2 and Cell 3 respectively and compare them to a pilot signal from their serving cell, Cell 1. The difference detected by UE1 in pilot signal between Cell 2 and Cell 1 indicates that UE1 is in the overlapping region. Similarly, the difference in pilot signal between Cell 3 and Cell 1 indicates that UE2 is in the overlapping region. UE1 and UE2 determine that they need to send bursty uplink traffic whilst in the locations shown. Since they are in an overlapping region, they select preambles corresponding to SHO common E-DCH resources.

Cell 1 receives preambles from UE1 and UE2, and assigns E-DCH 1 and E-DCH 3 to UE1 and UE2 respectively. Since Cell 2 and Cell 3 are aware of Cell 1 SFN timing, it is possible that they can also detect the preambles from UE1 and UE2 respectively.

Cell 2 and Cell 3 are operable to monitor for possible E-DCH 1 and E-DCH 3 transmissions respectively. As UE1 and UE2 start E-DCH transmissions, Cell 2 and Cell 3 detect E-DCH 1 and E-DCH 3 transmissions and are operable to be able to decode them. Cell 2 and Cell 3 are also operable to transmit control signals to UE1 and UE2 respectively to control their grants and transmit power. Hence, Cell 2 and Cell 3 can manage their user equipment transmissions occurring on user equipment attached to their neighbour cell, Cell 1, and manage their own uplink interference.

Embodiments allow some E-DCH resources to be used for CELL_FACH "SHO" allowing uplink interference to be managed.

A person of skill in the art would readily recognize that steps of various above-described methods can be performed by programmed computers. Herein, some embodiments are also intended to cover program storage devices, e.g., digital data storage media, which are machine or computer readable and encode machine-executable or computer-executable programs of instructions, wherein said instructions perform some or all of the steps of said above-described methods. The program storage devices may be, e.g., digital memories, magnetic storage media such as a magnetic disks and magnetic tapes, hard drives, or optically readable digital data storage media. The embodiments are also intended to cover computers programmed to perform said steps of the above-described methods.

The functions of the various elements shown in the Figures, including any functional blocks labelled as "processors" or "logic", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" or "logic" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non volatile storage. Other hardware, conventional and/or custom, may also be included. Similarly, any switches shown in the Figures are conceptual only. Their function may be carried out through the operation of program logic, through dedicated logic, through the interaction of program control and dedicated logic, or even manually, the particular technique being selectable by the implementer as more specifically understood from the context.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

The description and drawings merely illustrate the principles of the invention. It will thus be appreciated that those skilled in the art will be able to devise various arrangements that, although not explicitly described or shown herein, embody the principles of the invention. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

The invention claimed is:

1. A network control node method of reducing inter cell interference in a wireless communication network comprising a plurality of network access nodes supporting a region of radio coverage, said method comprising:
   discovering, for a first network access node, at least one adjacent network access node;
   allocating, by the network control node, at least one predetermined shared radio channel for which user equipment must compete for radio communication commenced within an overlapping radio coverage region between said first network access node and said at least one adjacent network access node; and
   communicating an indication of said at least one predetermined shared radio channel to said first network access node and said adjacent network access node, wherein said method further comprises:
   determining a first at least one predetermined shared radio channel for radio communication commenced within an overlapping radio coverage region between said first network access node and said adjacent network access node when said first network access node supports a serving cell and said at least one adjacent network access node supports a potential target cell;
   determining a second at least one predetermined shared radio channel for radio communication commenced within an overlapping radio coverage region between said first network access node and said at least one adjacent network access node when said first network access node supports a potential target cell and said at least one adjacent network access node supports a serving cell.

2. The method according to claim 1, comprising allocating a sub-set of all available shared radio channels to said allocated at least one predetermined shared radio channel for radio communication commenced within an overlapping radio coverage region between said first network access node and said adjacent network access node.

3. The method according to claim 1, comprising:
   determining a pair of said first at least one predetermined shared radio channel and said second at least one predetermined shared radio channel for a pair of said first network access node supporting a serving cell and said at least one adjacent network access node supporting a potential target cell.

4. The method according to claim 1, wherein said communicating an indication of said at least one predetermined shared radio channel to said first network access node and said adjacent network access node comprises an indication of how to decode communications made on said at least one predetermined shared radio channel.

5. A non-transitory computer-usable data carrier storing instructions that, when executed by a computer, cause the computer to perform the method of claim 1.

6. A network control node operable to reduce inter cell interference in a wireless communication network comprising a plurality of network access nodes, supporting a region of radio coverage, said network control node comprising:
discovery logic, operable to discover, for a first network access node, at least one adjacent network access node;
allocation logic, operable to allocate, by the network control node, at least one predetermined shared radio channel for which user equipment must compete for radio communication commenced within an overlapping radio coverage region between said first network access node and said adjacent network access node; and
communication logic, operable to communicate an indication of said at least one predetermined shared radio channel to said first network access node and said adjacent network access node, wherein said network control node further comprises:
determination logic, operable to determine a first at least one predetermined shared radio channel for radio communication commenced within an overlapping radio coverage region between said first network access node and said adjacent network access node when said first network access node supports a serving cell and said at least one adjacent network access node supports a potential target cell and to determine a second at least one predetermined shared radio channel for radio communication commenced within an overlapping radio coverage region between said first network access node and said at least one adjacent network access node when said first network access node supports a potential target cell and said at least one adjacent network access node supports a serving cell.

7. A network control access node method of controlling inter cell interference in a wireless communication network comprising a plurality of network access nodes supporting a region of radio coverage, said method comprising:
a network access node determining at least one predetermined shared radio channel for which user equipment must compete for radio communication commenced within an overlapping radio coverage region;
preparing for communications within said communication network on said predetermined shared radio channel by allocating said at least one predetermined shared radio channel to a request for a shared radio channel originating within said overlapping radio coverage region, wherein said request comprises a request for at least one predetermined shared radio channel for radio communication and said method further comprises determining whether said requested at least one predetermined shared radio channel for radio communication is available for use and, if not, allocating another of said at least one predetermined shared radio channels.

8. The method of controlling inter cell interference according to claim 7, wherein said preparing comprises:
preparing to decode information transmitted on said predetermined shared radio channel.

9. A non-transitory computer-usable data carrier storing instructions that, when executed by a computer, cause the computer to perform the method of claim 7.

10. A network access node operable to control inter cell interference in a wireless communication network comprising a plurality of network access nodes supporting a region of radio coverage, said network access node comprising:
determination logic, operable to determine at least one predetermined shared radio channel for which user equipment must compete for radio communication commenced within an overlapping radio coverage region;
preparation logic, operable to prepare for communications within said communication network on said predetermined shared radio channel by allocating said at least one predetermined shared radio channel to a request for a shared radio channel originating within said overlapping radio coverage region, wherein said request comprises a request for at least one predetermined shared radio channel for radio communication and said network access mode further comprises determination logic, operable to determine whether said requested at least one predetermined shared radio channel for radio communication is available for use and, if not, allocate another of said at least one predetermined shared radio channels.

* * * * *